US006668267B1

(12) United States Patent
Pomet

(10) Patent No.: US 6,668,267 B1
(45) Date of Patent: Dec. 23, 2003

(54) DEVICE AND METHOD FOR THE IMPLEMENTATION OF AN ELEMENTARY MODULAR OPERATION ACCORDING TO THE MONTGOMERY METHOD

(75) Inventor: Alain Pomet, Rousset (FR)

(73) Assignee: STMicroeletronics S.A., Montrouge (FR)

( * ) Notice: Subject to any disclaimer, the term of this patent is extended or adjusted under 35 U.S.C. 154(b) by 0 days.

(21) Appl. No.: 09/526,782

(22) Filed: Mar. 16, 2000

(30) Foreign Application Priority Data

Mar. 17, 1999 (FR) ............................................ 99 03407

(51) Int. Cl.[7] ............................................. G06F 15/00
(52) U.S. Cl. ....................................................... 708/492
(58) Field of Search ................................. 708/491, 492, 708/250, 523, 781, 530; 714/781; 380/30

(56) References Cited

U.S. PATENT DOCUMENTS

| | | | | |
|---|---|---|---|---|
| 5,513,133 A | * | 4/1996 | Cressel et al. | 708/491 |
| 5,745,398 A | * | 4/1998 | Monier | 380/30 |
| 5,764,554 A | * | 6/1998 | Monier | 708/491 |
| 5,961,578 A | | 10/1999 | Nakada | |
| 6,035,317 A | * | 3/2000 | Guy | 708/492 |
| 6,185,596 B1 | * | 2/2001 | Hadad et al. | 708/491 |
| 6,237,015 B1 | * | 5/2001 | Monier | 708/492 |
| 6,341,299 B1 | * | 1/2002 | Romain | 708/491 |
| 6,424,987 B1 | * | 7/2002 | Romain | 708/492 |

FOREIGN PATENT DOCUMENTS

WO          98/50851          11/1998

OTHER PUBLICATIONS

Toru Akishita, Fast Simultaneous Scalar Multiplication on Elliptic Curve with Montgomery Form, 2001, Sony Corporation, p. 1370–1371.*
Y. Tsuruoka et al., Fast Modular Mutiplications Based on Precomputations with Less Memory, Jul. 1997, Electronics Letters, vol. 33 No. 16, p. 255–267.*
Chang, et al. "Low–Power Digit–Serial Multipliers." IEE International Symposium on Circuits and System, US, New York, NY, 1997, pp. 2166–2167.

* cited by examiner

Primary Examiner—Chuong Dinh Ngo
Assistant Examiner—Chat C. Do
(74) Attorney, Agent, or Firm—Lisa K. Jorgenson; Allen, Dyer, Doppelt, Milbrath & Gilchrist, P.A.

(57) ABSTRACT

A coprocessor includes a single multiplication circuit coupled to a computation circuit dedicated to the computation of Y0, with Y0=(X*J0) mod $2^k$ and J0 being defined by the equation ((N*J0)+1) mod $2^k$=0. A method also computes a modular operation using the circuit for the computation of Y0. The computation circuit computes Y0 on the basis, first, of the k least significant bits of a data element X=S(i−1)+ (Ai*B) provided by an accumulator and, second, of the least significant word of N contained in a latch.

20 Claims, 5 Drawing Sheets

DEVICE AND METHOD FOR THE IMPLEMENTATION OF AN ELEMENTARY MODULAR OPERATION ACCORDING TO THE MONTGOMERY METHOD

FIELD OF THE INVENTION

The invention relates to a device and method for the implementation of an elementary modular operation according to the Montgomery method. This method can be used to perform modular computations in a finite field (or Galois field) without performing divisions.

BACKGROUND OF THE INVENTION

Modular operations in finite fields are used in cryptography for applications such as the authentication of messages, the identification of a user and the exchange of keys. Exemplary applications of this kind are described, for example, in the European patent application FR-A-2,679, 054.

There are commercially available integrated circuits dedicated to such applications, such as the product referenced ST16CF54, which is manufactured by STMicroelectronics S.A., the current assignee of the present invention. This product is built around a central processing unit and an arithmetic coprocessor for implementing modular computations. The coprocessor enables the processing of the modular multiplications by using the Montgomery method, which is the object of the European patent application EP-A-601,907.

The basic operation, called a $P_{field}$ operation, includes the use of three binary data elements A (multiplicand), B (multiplier lower than N) and N (modulo) encoded on an integer number of n bits to produce a binary data element referenced $P(A, B)_N$ encoded on n bits such that $P(A, B)_N = A*B*I \mod N$, with $I = 2^{-n} \mod N$. For this purpose, it is assumed that the data elements are encoded on m words of k bits with $m*k = n$, and the words A and B are given to a multiplication circuit having a serial input, a parallel input and a series output.

For the coprocessor described in the above referenced European patent application EP-A-601,907, we have k=32 and m=8 or 16. FIG. 1 shows the modular arithmetic coprocessor disclosed by the referenced patent application. This coprocessor includes the following elements:

three shift registers 10, 11 and 12, with m*k bits, designed to receive respectively the multiplier B, the result S and the modulo N;

multiplexers 13 to 15 that are respectively connected to the inputs of the registers 10 to 12;

three k-bit shift registers 16, 17 and 18 having one series input and one parallel output, designed to receive respectively k bits of the multiplicand A, a computation parameter referenced J0, an intermediate result referenced Y0;

two multiplication circuits 19 and 20 each having one series input, one parallel k-bit input and one series output;

two k-bit parallel latches 21 and 22 used as a buffer for the multiplication circuits 19 and 20;

a multiplexer 23 used to connect the latch 22 either to the register 17 or to the register 18;

three multiplexers 24, 25 and 26 used to route the data elements to the inputs of the multiplication circuits 19 and 20;

three subtraction circuits 27, 28 and 29 each comprising two series inputs and one series output;

two addition circuits 30 and 31, each having two series inputs and one series output;

three delay cells 32, 33 and 34 that are actually k-bit shift registers and are used to delay the data elements by k clock cycles to mask the computation time of the multiplication circuits 19 and 20;

a comparison circuit 35;

two multiplexers 36 and 37 used to control the subtraction circuits 27 and 28;

a multiplexer 38; and a demultiplexer 39.

For further details on the making of these elements, reference may be made to the above referenced European patent application EP-A-601,907.

To perform an elementary operation called a $P_{field}$ operation of the $P_{field}(A, B)_N = A*B*I \mod N$ type, A and B are encoded on a number of m k-bit words and I is an error equal to $2^{-m*k}$, and the iteration of the next loop is performed m times with i being an index varying from 0 to m−1:

$X = S(i-1) + Ai*B$;

$Y0 = (X*J0) \mod 2^k$;

$Z = X + (N*Y0)$;

$S(i) = Z/2^k$ (an integer division);

if S(i) is greater than N, then N is subtracted from S(i) before the next iteration;

with $S(-1)=0$, Ai is the k-bit word with a place value i, and J0 is a k-bit word defined by the equation $((J*Y0)+1) \mod 2^k = 0$.

The coprocessor of FIG. 1 enables the performance of a full iteration by a simultaneous shift, by m*k bits, of the registers 10 to 12 respectively containing B, S(i−1) and N followed by a shift, by 2*k bits, of the register 12 to store S(i). The word Ai is loaded into the register 21 and the word J0 is loaded into the register 17. To perform the full computation of $P_{field}(A, B)_N$, it is enough to repeat each iteration m times by changing the word Ai contained in the register 21 during each iteration.

The operation $X = S(i-1) + Ai*B$ is done by the multiplication circuit 19 and the addition circuit 30. The operation $Y0 = (X*J0) \mod 2^k$ is done, during the k first shifts, in the multiplication circuit 20 while storing J0 in the register 22 and storing the result Y0 in the register 18. The operation $Z = X + (N+Y0)$, with N and X having been delayed by k bits in the delay cells 32 and 34 and with Y0 having been put into the latch 22, is performed by the multiplication circuit 20 and the addition circuit 31. The operation $S(i) = Z/2^k$ is done by a k-bit shift. The comparison of S(i) with N is done by the subtraction of N from S(i) in the subtraction circuit 29. N is delayed by k bits in the delay cell 33, and a possible overflow is detected and stored in the comparison circuit 35 to find out the result of the comparison. The subtraction of N from S(i) is done during the next iteration in the subtraction circuit 28.

Many improvements have been made in this circuit. The improvements are aimed at obtaining higher speeds, reducing the size of the circuit, reducing the consumption of the circuit, and/or providing additional functions without considerably increasing the size of the circuit. Those skilled in the art may refer to the publications of the European patent applications EP-712,070, EP-712,071, EP-712,072, EP-778, 518, EP-784,262, EP-785,502, EP-785,503, EP-793,165, EP-853,275, and also to the publication of the international patent application WO/97-25,668.

There is also another circuit known from the publication of the European patent application EP-566,498 enabling the computation of the elementary operation $P(A, B)_N = A*B*I \bmod N$, with $I=2^{-n}$ and n is the size of A, B or N. This circuit uses a single parallel/series multiplication circuit, in the form of a parallel adder coupled with a shift register.

The circuit does not produce exactly the Montgomery algorithm and uses an intermediate data element equal to $N-1)/2+1$. The circuit uses a multiplication circuit having a parallel input with n bits and is limited to computation operands with a permanently fixed size. Furthermore, the size of the circuit disclosed in the European patent application EP-566,498 is proportional to the size of the operands used. Consequently, the surface area thus occupied by the circuit is considerable.

SUMMARY OF THE INVENTION

The present invention is aimed at improving the prior art by providing a coprocessor that uses a single multiplication circuit coupled to a computation circuit dedicated to the computation of Y0, with $Y0=(X*J0) \bmod 2^k$ and J0 being defined by the equation $((N*J0)+1) \bmod 2^k=0$. The invention also provides a method for the computation of a modular operation using the circuit for the computation of Y0.

An object of the invention is to provide an integrated circuit comprising a modular arithmetic coprocessor comprising:

storage means to store and provide, in series, first and second operands A and B, a modulo N and a result S with A as an integer encoded on a*k bits, a is a non-zero integer at most equal to m, and B, N and S are integers encoded on at most m*k bits, m and k are integers greater than 1;

computation means to perform modular operations according to the Montgomery method, wherein the computation means comprises a first k-bit latch to store a k-bit word Ai of A, and a second k-bit latch to store either the least significant word of N or an intermediate data element Y0 encoded on k bits such that $Y0=((S(i-1)+(Ai*B))*J0) \bmod 2^k$, with i as a loop index varying from 0 to a−1, S(i−1) as an updated result of S during the (i−1)th iteration, S(−1) is equal to zero, Ai is the ith k-bit word of A, and J0 is a k-bit word for the equation $((J0*N)+1) \bmod 2^k=0$;

an addition means to add up the contents of the first and second latches;

a selection means coupled to the outputs of the first and second latches and to the addition means in order to give, at a parallel output, either the word contained in the first latch or the word contained in the second latch, or the sum of the words contained in the first and second latches, or the word zero, first as a function of a bit of B, and second as a function of a bit of N;

an accumulator circuit that adds up, shifts by one bit and stores the words given successively by the selection device with one bit of an updated result S(i), the bit output from the accumulator circuit becoming a new updated result; and a circuit to compute an intermediate data element Y0 connected, first, to the output of the second latch to receive the least significant k-bit word of N and, second, to the output of the accumulator to receive a data element $X=S(i-1)+Ai*B$.

Preferably, the circuit to compute the data element Y0 comprises a k−1 bit shift storage register that stores the data output from the computation circuit; a multiplication circuit to multiply the contents of the storage register by the contents of the second latch apart from the least significant bit contained in the second latch and provide a result bit in series; and a subtraction circuit for the bit-by-bit subtraction of the result output from the multiplication circuit from the result output from the accumulator.

Another object of the invention is to provide a method for performing a modular operation according to the Montgomery method by the series shifting of the first and second operands A and B, an N modulo and an updated result through computation means with A as an integer encoded on a*b bits. The variable a is a non-zero integer at most equal to m and B, N and S are integers encoded on at most m*k bits, and m and k are integers greater than 1. An intermediate data element Y0 is computed such that $Y0=((S(i-1)+(Ai*B))*J0) \bmod 2^k$ in an iterative loop indexed by i, with i varying from 0 to a−1 and with S(i−1) corresponding to the (i−1)th updated result. S(−1) is equal to 0, Ai is the ith k-bit word of A, and J0 is a k-bit word resolving the equation $((J0*N)+1) \bmod 2^k=0$, wherein Y0 is computed in a computation circuit that gives Y0 bit by bit, first, from a word No of k least significant bits of N and, second, from an intermediate data element $X=S(i-1)+Ai*B$.

Preferably the computation of Y0 comprises the following steps of loading in a shift register of the least significant bit of X, with this bit being equal to the least significant bit of Y0; and multiplying in a multiplication circuit the k−1 most significant bits of N0 by the k−1 least significant bits of Y0 by the shifting of Y0 in the shift register; and subtracting bit-by-bit in a subtraction circuit the result output from the multiplication circuit from the k−1 most significant bits of the least significant word of the data element X, with the output result bit being a bit of Y0 that is stored in the shift register.

According to one embodiment, the method furthermore comprises the repetition of the following steps, with i being an index varying from 0 to a−1:

storing a k-bit word Ai corresponding to a word i of A in a first k-bit latch;

computing an intermediate data element Y0 such that $Y0=((S(i-1)+(Ai*B))*J0) \bmod 2^k$, with S(i−1) corresponding to the (i−1)th updated result, S(−1) is equal to 0 and J0 is a k-bit word resolving the equation $((J0*N)+1) \bmod 2^k=0$;

storing the least significant k-bit word of N and then Y0 in a second k-bit latch;

adding in a parallel addition circuit the words contained in the first and second latches;

selecting and supplying either the word contained in the first latch or the word contained in the second latch, or the sum of the words contained in the first and second latches, or zero as a function, first, of a bit of B and, second, either of a bit of Y0 or of a bit of N; and successive adding in an accumulator circuit of the words given by the selection device for each pair of bits of B and N, with the result of each addition being added to a bit of the previous updated result S(i−1) and then shifting by one bit and storing between each addition, with the bit output from the accumulator during the shift corresponding to a new updated result S(i).

BRIEF DESCRIPTION OF THE DRAWINGS

The invention will be understood more clearly and other particular features and advantages will appear from the following description, made with reference to the appended drawings, of which.

DETAILED DESCRIPTION OF THE PREFERRED EMBODIMENTS

Figure 1:
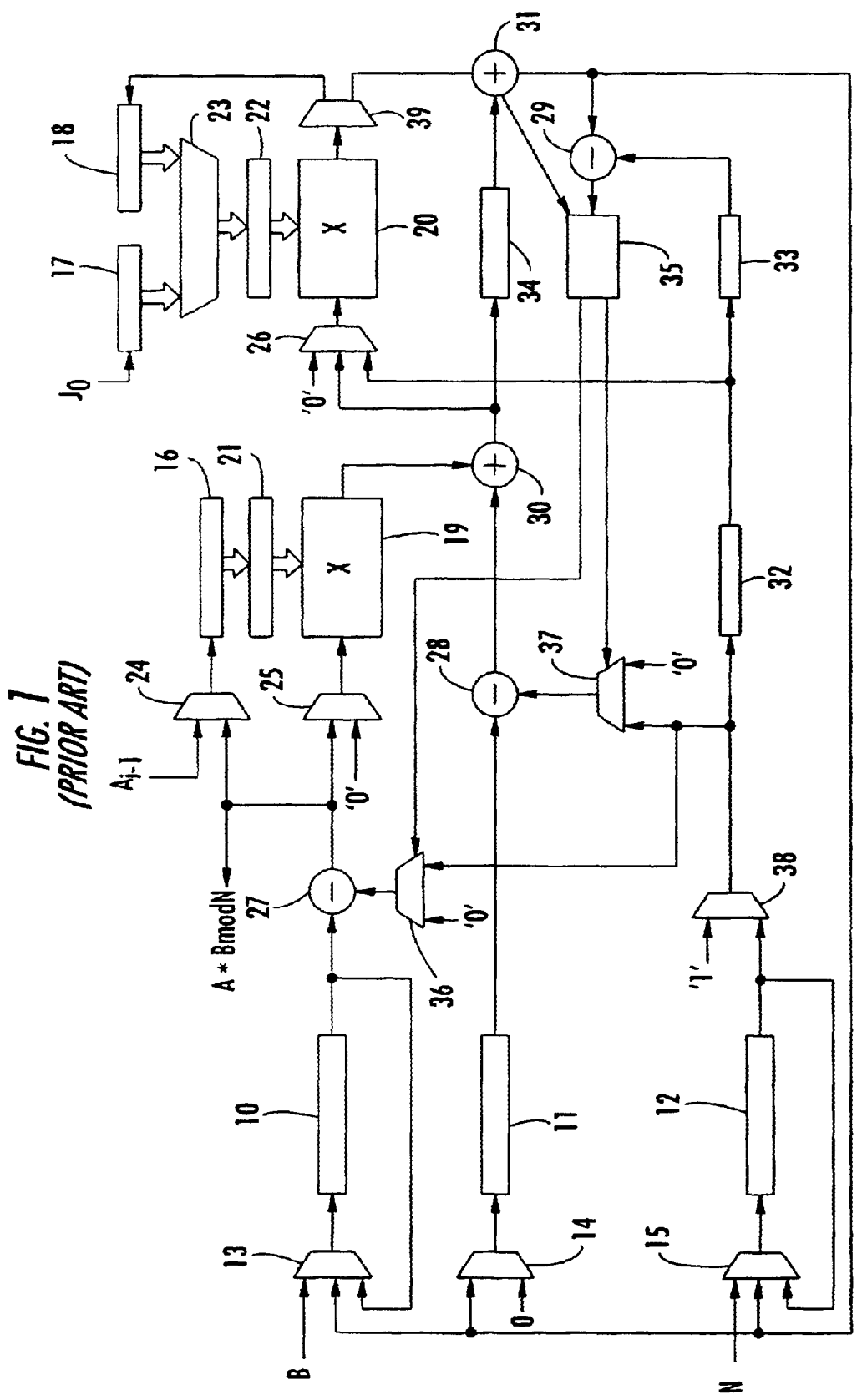
FIG. 1 shows a modular arithmetic coprocessor according to the prior art.
Figure 2:
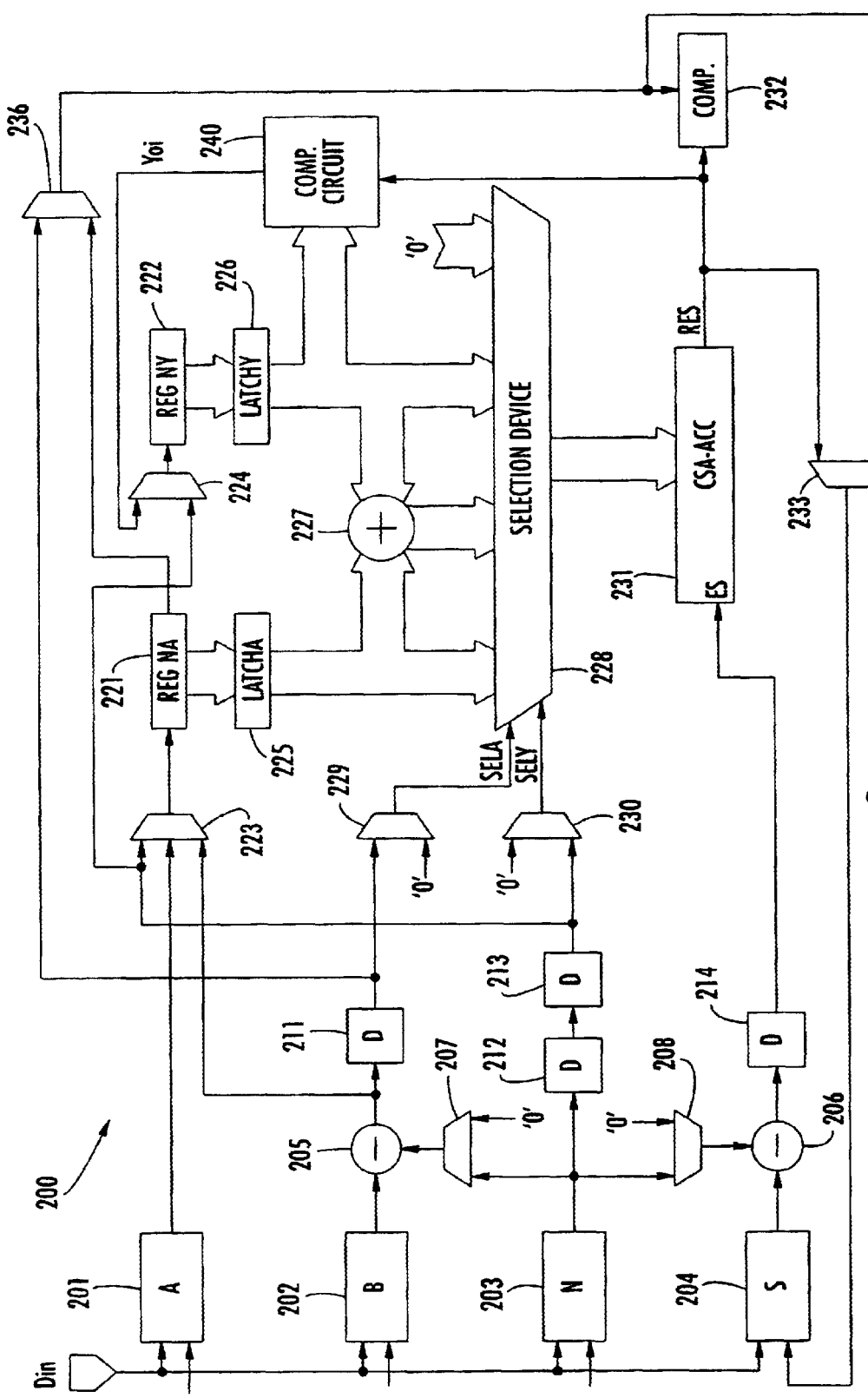
FIG. 2 shows a modular arithmetic coprocessor according to the present invention, and FIGS. 3 to 8 give a detailed view of the different elements of the coprocessor illustrated FIG. 2.

FIG. 2 shows the modular arithmetic coprocessor 200 in a preferred embodiment. In order to avoid burdening the drawing, only the routing of the data elements has been shown. A state machine (not shown) sends the necessary control signals to the different functional elements of the coprocessor 200. The coprocessor 200 has the following elements.

First to fourth storage devices 201 to 204 respectively containing data elements A, B, N and S. The data elements A, B, N and S are data elements encoded on at most a number m of k-bit words. The storage devices 201 to 204 make it possible to furnish any k-bit word of the stored data independently. Each storage device 201 to 204 has first and second series inputs and a series type of data output. The first input of each storage device 201 to 204 is connected to an input terminal Din.

First and second series type subtraction circuits 205 and 206 have first and second inputs and a series type output. The first input of the first subtraction circuit 205 is connected to the output of the second storage device 202. The first input of the second subtraction circuit 206 is connected to the output of the fourth storage device 204.

First and second multiplexers 207 and 208 are coupled respectively to the second inputs of the first and second subtraction circuits 205 and 206. The first and second multiplexers 207 and 208 have two inputs each, one of the inputs receives a logic zero and the other of the inputs are connected to the output of the third storage device 203. The association of the first and second subtraction circuits 205 and 206 with the first and second multiplexers 207 and 208 enables the subtraction of either zero or of the data element output from the third storage device 203 from the data elements output from the second and fourth storage devices 202 and 204.

First to fourth delay circuits 211 to 214 are used to synchronize the data elements by delaying them by one cycle of the signal of a rate-setting clock. Each of the delay circuits 211 to 214 has an input and an output, and each delay circuit is formed by a simple D type synchronous latch, for example. The input of the first delay circuit 211 is connected to the output of the first subtraction circuit 205. The input of the second delay circuit 212 is connected to the output of the third storage device 203. The input of the third delay circuit 213 is connected to the output of the second delay circuit 212. The input of the fourth delay circuit 214 is connected to the output of the second subtraction circuit 206.

A first k-bit shift register 221 has a series input, a series output and a parallel output. This first register 221 is used first as a buffer register for the words of A, and second as a k clock cycle delay circuit for N.

A second k-bit shift register 222 has a series input and a parallel output. The second register 222 is used as a buffer register first for the least significant word N0 of N, and second for the intermediate data element Y0.

A third multiplexer 223 is associated with a first register 221. The third multiplexer 223 has three inputs and one output, and the output is connected to the input of the first register 221. One of the inputs of the third multiplexer 223 is connected to the output of the first storage device 201. Another of the inputs of the third multiplexer is connected to the output of the first subtraction circuit 205. The last of the inputs of the third multiplexer 223 is connected to the output of the third delay circuit 213.

A fourth multiplexer 224 is associated with the second register 222. The fourth multiplexer 224 has first and second inputs and one output, and the output is connected.to the input of the second register 222. The first input of the fourth multiplexer 224 is connected to the; output of the third delay circuit 213.

First and second k-bit latches 225 and 226 are used for the storage, during the computation, first of a word of A and second of the least significant word N0 of N or the intermediate data element Y0. Each of the latches 225 and 226 has one parallel input and one parallel output, with the inputs of the first and second latches 225 and 226 respectively connected to the parallel outputs of the first and second registers 221 and 222.

An addition circuit 227 having two parallel inputs and one parallel output has both its inputs connected respectively to the outputs of the first and second latches 225 and 226. The output of the addition circuit 227 thus gives the sum of the contents of the first and second latches 225 and 226.

A selection device 228 is connected to the outputs of the first and second latches 225 and 226 and to the output of the addition circuit 227 so that, at a parallel output, it can give either the contents of the first latch 225 or the contents of the second latch 226, or the sum of the contents of the first and second latches 225 and 226 or zero. The selection device 228 furthermore has first and second selection inputs which respectively receive a first selection signal SELA and a second selection signal SELY. When the first and second signals SELA and SELY are both at a zero logic level, then the output of the selection device 228 gives, at its output, the number zero encoded on k+1 bits. When the first selection signal SELA is at a logic one level, and the second selection signal SELY is at a logic zero level, then the output of the selection device 228 gives, at its output, the contents of the first latch 225. When the first selection signal SELA is at a logic zero level and the second selection signal SELY is at a logic one level, then the output of the selection device 228 gives, at its output, the contents of the second latch 226. When the first and second signals SELA and SELY are both at a logic one level, then the output of the selection device 228 gives, at its output, the sum of the contents of the first and second latches 225 and 226.

A fifth multiplexer 229, having two inputs and one output, has its output connected to the first selection input of the selection device 228. One of the inputs of the fifth multiplexer 229 is connected to the output of the first delay circuit 211. The other of the inputs of the fifth multiplexer 229 receives a logic zero.

A sixth multiplexer 230 having first to third inputs and one output has its output connected to the second selection input of the selection device 228. The first input of the sixth multiplexer 230 receives a logic zero. The second input of the sixth multiplexer 230 is connected to the output of the third delay circuit 213.

An accumulator circuit 231 performs a double multiplication by the successive addition of the words output from the selection device 228. The accumulator circuit 231 has a parallel input connected to the output of the selection device 228, a series input connected to the output of the fourth delay circuit 214 and a result output. At each cycle of the sequencing clock of the coprocessor 200, the accumulator circuit adds up a bit present at the series input with a word present at the parallel input and with an internal result. The new result is then shifted to become a new internal result.

A seventh multiplexer 233 has two inputs and one output. One of the inputs of the seventh multiplexer 233 is connected to the result output of the accumulator circuit 231. The output of the seventh multiplexer 233 is connected to the second inputs of the storage devices 201 to 204.

An eighth multiplexer 236 has two inputs and one output. One of the inputs of the eighth multiplexer 236 is connected to the series output of the first register 221. The other of the inputs of the eighth multiplexer 236 is connected to the series output of the first delay circuit 211. The output of the eighth multiplexer 236 is connected to the other input of the seventh multiplexer 233.

A two-input comparison circuit 232 makes a bit-by-bit comparison of the result output from the accumulator circuit 231 with the data output in series from the eighth multiplexer 236. The result of the comparison is then transmitted to a management circuit (not shown) of the coprocessor 200.

A computation circuit 240 performs the computation of the intermediate variable Y0. The computation circuit 240 has a parallel input connected to the output of the second latch 226, a series input connected to the output of the accumulator 231 and a series output connected to the second input of the fourth multiplexer 224.

FIG. 2 shows a routing of data between different functional elements. The routing, shown using different multiplexers, may have numerous variations. What is important is to provide for data exchanges between the different computation and storage elements.

Figure 3:
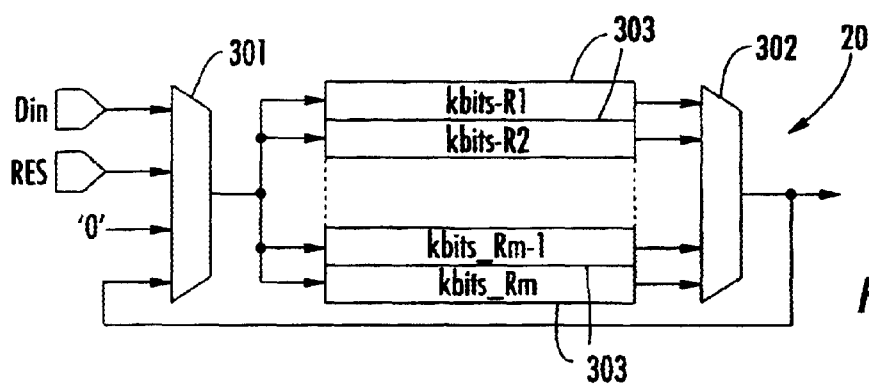

Certain elements of FIG. 2 do not correspond exactly to standard elements commonly used by those skilled in the art. FIGS. 3 to 7 specify the structure of these different elements. FIG. 3 corresponds to one of the storage devices 201 to 204. The storage device 201 has two multiplexers 301 and 302 and first to mth shift registers 303 referenced R1 to Rm.

The multiplexer 301 has first to fourth inputs and one output. The first and second inputs of the multiplexer 301 constitute the first and second inputs of the storage device 201. The third input of the multiplexer 301 receives a logic zero. The first to mth registers 303 are k-bit shift registers which have a series input and a series output. The inputs of the first to mth registers 303 are connected together to the output of the multiplexer 301.

The multiplexer 302 has first to mth inputs and one output. The first to mth inputs of the multiplexer 302 are respectively connected to the outputs of the first to mth registers 303. The output of the multiplexer 302 is connected to the fourth input of the multiplexer 301. Control signals (not shown) are used to select the inputs of the multiplexers 301 and 302 and validate the shift independently in each of the registers 303. When it is sought to store an m*k bit data element in the storage device 201, the data element is stored in k-bit words in each of the registers 303. To store the data, it is enough to perform k shifts of the first register 303 and then k shifts of the second register 303 until the mth register 303. The multiplexer 301 selects the source of the data element.

To provide a data element encoded on m*k bits, it is enough to shift the registers 303 one after the other in the order of storage of the data. The looping of the output of the multiplexer 302 to the fourth input of the multiplexer 301 enables the entry, into one of the registers 303, of the k-bit word that is output simultaneously. This looping ensures the storage of the data elements making it possible to obtain several outputs of the same data element. It is possible to make independent use of any k-bit word of a data element comprising several k-bit words. It is also possible to make a k-bit word enter one of the registers 303 while a k-bit word is output from another of the registers 303.

Figure 4:
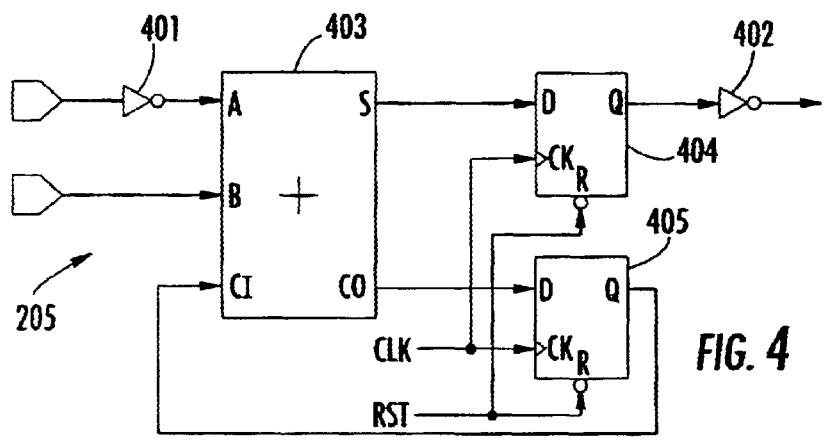

FIG. 4 shows the first (or second) subtraction circuit 205 (or 206). The subtraction circuit 205 has two inverters 401 and 402, an elementary adder and two D type storage latches 404 and 405 connected according to a prior art technique as indicated in FIG. 4.

This subtraction circuit 205 produces a systematic delay of one clock cycle on the data elements that flow through it. The second delay circuit 212 is used to compensate for the delays produced on the data elements that are output from the third storage device 203. Similarly, it is also possible to compensate for the delays at the output of the first storage device 201. However, the data elements output from the first storage device 201 do not need to be synchronized with the other data elements.

The use of the subtraction circuit 205 as shown in FIG. 4 also makes it possible to overcome the effects of the first, third and fourth delay circuits 211, 213 and 214. Indeed, the latch 404 produces an identical delay. It is enough to extract the signal at the input of the latch 404 and the inverter to obtain the next output bit. One drawback is that of not having a stable signal as soon as the active edge of the clock-signal arises. For the systems working with a low clock frequency, this provides for a saving of three D type latches.

Figure 5:
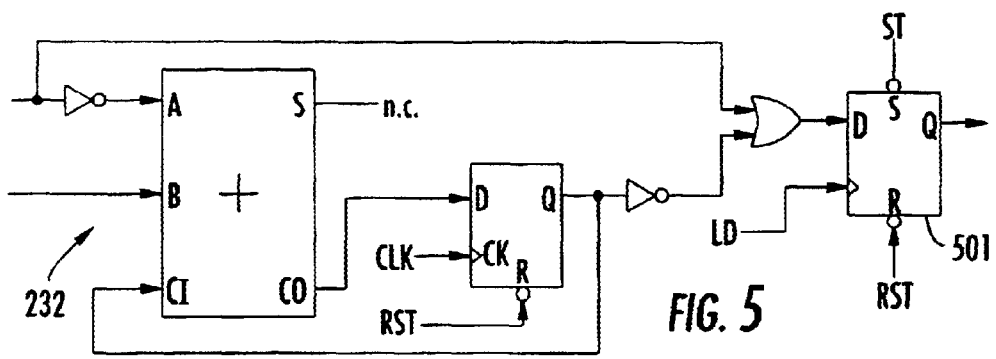

The circuit of FIG. 5 shows the comparison circuit 232 in detail. The comparison circuit 232 corresponds to a subtraction circuit in which the stored carry value and the data that reaches the first input of the subtraction circuit are extracted. This subtraction circuit is simplified in the figure. The stored carry value is inverted and then entered into a logic OR circuit with the data element present on the first input. The result output from the logic OR circuit when the totality of the data elements is entered into the comparison circuit 232 makes it possible to find out which of the two data elements is greater than the other. The result is stored in a D type latch 501.

The D type latch 501 has a data input, a clock input, a setting input, a resetting input, and an output. The data input receives the data element output from the logic OR circuit, the clock input receives a loading signal LD whose leading edge corresponds to the instant at which it is sought to obtain the result of the comparison. The setting and resetting inputs receive the prepositioning signals ST and RST to set or reset the comparison circuit 232. The output of the latch 501 is connected to a sequencing device (not shown) of the coprocessor 200.

Figure 6:
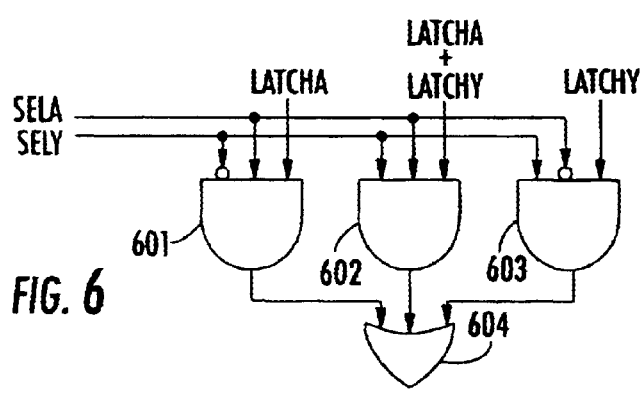

FIG. 6 shows an element of the selection device 228. The selection device has k+1 elements of this type. This element includes three three-input AND gates 601 to 603, two AND gates 601 and 603 having an inverter input and one three-input OR gate 604. The role of this element is the same as that of a four-input multiplexer whose fourth input receives a logic zero. In the selection device 228, the element corresponding to the most significant bit has only the central AND gate 602 because the first and second latches 224 and 225 have only k bits.

Figure 7:
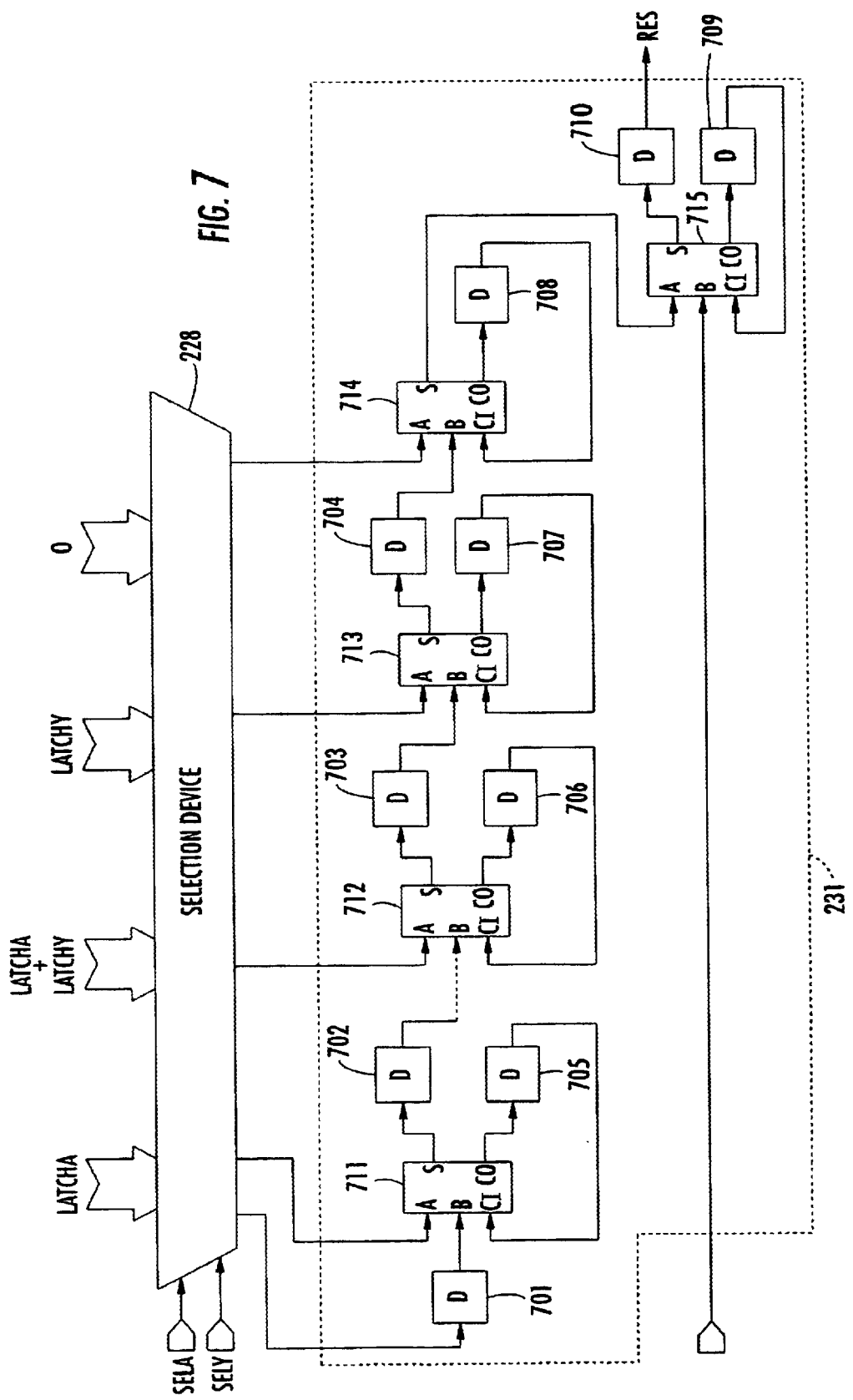

FIG. 7 shows an assembly constituted by the accumulator circuit 231 and the selection device 228. The assembly thus formed carries out two operations of multiplication with the addition of two products and the addition of another series data element. If LATCHA is the data element present in the first latch 225, LATCHY is the data element present in the second latch 226, SELA is the data element arriving serially at the first selection input of the selection device 228, SELY is the data element arriving serially at the second selection input of the selection device, ES is the data element arriving serially at the series input of the accumulator 231 and RES is the result output serially from the accumulator 231, then the following operation is performed:

$$RES=(SELY*LATCHY)+(SELA+LATCHA)+ES$$

The structure of the accumulator circuit 231 corresponds to a standard accumulator structure. The circuit 231 comprises:

first to kth accumulation latches 701 to 704, such as D type latches. Each latch has a data input and an output. The data input of the first latch 701 is connected to the conductor that corresponds to the most significant value (namely with the place value k) of the parallel output of the selection device 228;

first to (k+1)th carry latches 705 to 709, such as D type latches, each having a data input and an output;

a result latch 710, such as a D type latch, having a data input and an output corresponding to the output of the accumulator 231; and first to (k+1)th standard adders 711 to 715 (or complete adders) each having first to third inputs, one result output, and one carry output. The first inputs of the first to kth adders 711 to 714 are connected to the selection device 228 to respectively receive the bits with place values k−1 to 0. The second inputs of the first to kth adders 711 to 714 are connected respectively to the outputs of the first to kth accumulation latches 701 to 704. The first input of the (k+1)th adder 715 is connected to the result output of the kth adder 714. The second input of the (k+1)th adder 715 corresponding to the series input of the accumulator 231 receives the data element ES. The third inputs of the first to (k+1)th adders 711 to 715 are respectively connected to the outputs of the first to (k+1)th carry latches 705 to 709. The result outputs of the first to (k−1)th adders 711 to 713 are respectively connected to the data inputs of the second to kth accumulation latches 702 to 704. The result output of the (k+1)th adder 715 is connected to the input of the result latch 710. The carry outputs of the first to (k+1)th adders 711 to 715 are respectively connected to the data inputs of the first to (k+1)th carry latches 705 to 709.

In practice, the carry, accumulation and result latches 701 to 710 also comprise clock inputs and setting inputs. All the clock inputs of the latches 701 to 710 are connected together and receive the same clock signal. Similarly, all the setting inputs are connected together to be reset simultaneously with each computation. These inputs are not shown in order to avoid unnecessarily burdening the drawings.

Operation of the device described in FIG. 7 is relatively straightforward. During each cycle of a clock signal that synchronizes the coprocessor, either LATCHA, LATCHY, LATCHA+LATCHY or zero are added up, with the contents of the carry latches 705 to 709 and with the arriving bit of the data element ES, to the contents of the accumulation latches 701 to 704. The word contained in the accumulation latches 701 to 704 is successively shifted so that the bit contained in the result latch 710 corresponds to the bit that is output from the accumulator 231.

Before beginning a computation, a resetting is done for all the accumulation, carry and result latches 701 to 710. Then, the double multiplication is done by the simultaneous shifting of the data elements SELA, SELY and ES at each cycle of the clock signal. The bits of SELA and SELY determine those data elements among LATCHA and LATCHY that must be accumulated. Reference is directed to the discussion of the selection device 228. When the totality of the data bits SELA and SELY have been shifted, namely after m*k clock cycles, 0s are given for k+1 clock cycles instead of the data elements SELA, SELY and ES in order to output the end of the result still contained in the accumulation latches 701 to 704. If the data elements are encoded on different numbers of bits, it is necessary to complete each data element using 0s.

Figure 8:
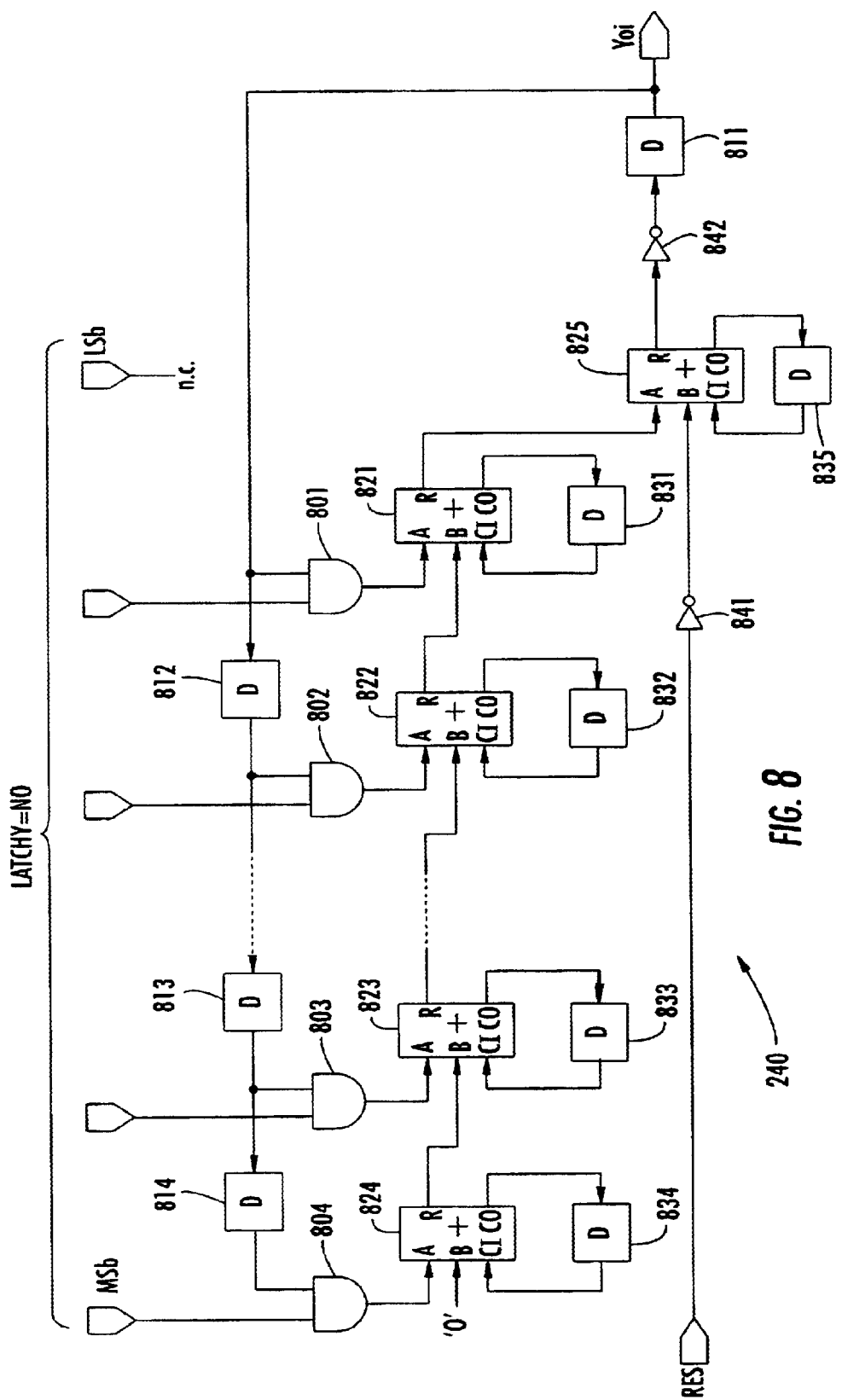

FIG. 8 shows the computation circuit 240 which performs the computation of the intermediate data Y0. The circuit 240 comprises:

first to (k−1)th AND gates 801 to 804 having first and second inputs and one output. The set of first inputs of the gates 801 to 804 respectively form the wires corresponding to the k−1 most significant bits of the parallel input of the circuit 240. The first input of the first AND gate 801 receives the second least significant bit and the first input of the (k−1)th AND gate 804 receives the most significant bit of the data element LATCHY present in the second latch 226;

first to (k−1)th delay latches 811 to 814, such as D type latches, each having a data input and a data output. The input of each of the second to (k−1)th delay latches 812 to 814 is respectively connected to the output of each of the first to (k−2)th delay latches 811 to 813. The output of the first delay latch 811 corresponds to the output of the computation circuit 240. The output of each of the first to (k−1)th delay latches 811 to 814 are respectively connected to the second input of each of the first to (k−1)th AND gates 801 to 804;

first to kth standard adders 821 to 825 (or complete adders) each having first to third inputs, one result output and one carry output. The first inputs of the first to (k−1)th adders 821 to 824 are respectively connected to the outputs of the first to (k−1)th AND gates 801 to 804. The first input of the kth adder 825 is connected to the result output of the first adder 821. The second inputs of the first to (k−2)th adders 821 to 823 are respectively connected to the result outputs of the second to (k−1)th adders 822 to 824. The second input of the (k−1)th adder 824 receives a zero;

first to kth carry latches 831 to 835, such as D type latches, each having a data input and a data output. The data inputs of the first to kth carry latches 831 to 835 are respectively connected to the carry outputs of the first to kth adders 821 to 825. The outputs of the first to kth carry latches 831 to 835 are respectively connected to the third inputs of the first to kth adders 821 to 825; and first and second inverters 841 and 842, each having one input and one output. The input of the first inverter 841 corresponds to the series input of the computation circuit 240. The output of the first inverter 841 is connected to the second input of the kth adder 825. The input of the second inverter 842 is connected to the result output of the kth adder 825. The output of the second inverter 842 is connected to the input of the first delay latch 811.

Those skilled in the art will have understood that the delay latches 811 to 814 and carry latches 831 to 835 also have clock inputs and resetting inputs that are not shown so as not to burden the drawings. However, the clock inputs are connected together to receive a single clock signal common to the entire coprocessor 200. The resetting inputs are also connected together to receive a common resetting signal during each new computation.

Those skilled in the art can see that the assembly formed by the first and second inverters 841 and 842 of the kth adder 825 and the kth carry latch 835 correspond to a subtraction circuit. Similarly, those skilled in the art can see that the first to (k−1)th delay latches 811 to 814 correspond to a shift register of k−1 bits that makes a bit-by-bit storage of the result Y0 output from the computation circuit 240. The assembly formed by the first to (k−1)th delay latches 811 to 814, the first to (k−1)th carry latches 831 to 834, the first to (k−1)th AND gates 801 to 804 and the first to (k−1)th adders 821 to 824 corresponds to a parallel/series multiplication circuit that multiplies the k−1 most significant bits of the data element present in the second register 226 by the result output from the computation circuit.

To make it possible to compute Y0, it is however necessary to place, in the second latch 226, the word N0 with k least significant bits of the modulo N value and provide, at the series input of the computation circuit 240, a data element X=S(i−1)+Ai*B that is defined in the Montgomery method. The computation circuit 240 will resolve the equation $0=(X+(N*Y0)) \mod 2^k$, which amounts to saying that k bits of Z=X+(N*Y0) are equal to zero. Thus, the step of the computation $Y0=(X*J0) \mod 2^k$ is no longer achieved.

The computation of Y0 takes place as follows:

the delay latches 811 to 814 and carry latches 831 to 835 are initialized; and a k bit shift is made in the data element X during each clock cycle. The first shift by one bit has the effect of loading the least significant bit of X into the register constituted by the delay latches 811 to 814. This bit is equal to the least significant bit of Y0. The k−1 next shifts perform a multiplication, in the multiplication circuit, of the k−1 most significant bits of No by the k−1 least significant bits of Y0 as and when Y0 is produced. Second, the k−1 next shifts perform a bit-by-bit subtraction, in the subtraction circuit, of the result output from the multiplication circuit from the k−1 most significant bits of the least significant k-bit word of the data element X. Each bit of the result output from the subtraction circuit corresponds to a bit of Y0 that is stored in the shift register.

Now that the structural and functional description of the elements comprising the coprocessor has been made, it is necessary to explain the overall operation of the coprocessor. The following explanations will enable those skilled in the art to comprehensively synchronize the coprocessor in order to obtain the desired operations. Hereinafter, we shall use the data elements A, B and N which are non-zero integers. The N data element has an even parity, encoded respectively on a*k, b*k and n*k bits, with a, b and n being non-zero integers smaller than m.

The elementary operation $P_{field}(A, B)_N = A*B*I \mod N$ is described below.

A) Resetting of the coprocessor:

the data elements A, B, N respectively are loaded into the first to third storage devices 201 to 203;

the zeros are loaded into the fourth storage device 204, and the data element is called S(−1); and the comparison device 232 is reset so that the last comparison indicates that N is greater than S(−1);

B) Repetition a times of the following computation loop, with i being an index varying from 0 to a−1:

B-1) A simultaneous loading is done of the ith least significant word Ai of A into the first register 221, and the N0 least significant word of N into the second register 222.

B-2) Then, a simultaneous loading is done of the words Ai and N0 respectively into the first and second latches 225 and 226.

B-3) The subtraction circuits 205 and 206, the delay circuits 211 to 214, the first register 221, all the latches 701 to 710 of the accumulator 231, and all the latches 811 to 814 and 831 to 835 of the computation circuit 240 are reset.

B-4) The words B and S(i−1) contained in the second and fourth storage devices 202 to 204 are shifted simultaneously by two bits. Zeros are given on the first and second inputs of the selection device 228.

B-5) There are k successive shifts made on the second and fourth storage devices 202 and 204 and on the second register 222. The output of the computation circuit 240 is connected to the input of the second register 222. The data element B is given to the first selection input of the selection device 228. The second selection input of the selection device 228 receives a zero. The series input of the accumulator 231 receives S(i−1) if the last comparison indicates that S(i−1)<N, or receives S(i−1)−N if the last comparison indicates that S(i−1)≧N. The subtraction is done in the second subtraction circuit 206. The output of the accumulator 231 gives the k least significant bits of X=S(i−1)+Ai*B bit by bit.

B-6) The contents of the second register 222 equal to Y0 are transferred into the second latch 226.

B-7) A resetting is done at the subtraction circuits 205 and 206, the delay circuits 211 to 214, the first register 221 and all the latches 701 to 710 of the accumulator 231.

B-8) A simultaneous shift by two bits is made of the words B, N and S(i−1) contained in the second to fourth storage devices 202 to 204. Zeros are given at the first and second inputs of the selection device 228.

B-9) There are n*k successive shifts made in the second to fourth storage devices 202 to 204 and on the first register 221. The data element B is given to the first selection input of the selection device 228. The data element N is given bit by bit first to the input of the first register 221, and second to the second selection input of the selection device 228. The series input of the accumulator 231 receives S(i−1) if the last comparison indicates that S(i−1)<N or receives S(i−1)−N if the last comparison indicates that S(i−1)≧N. The subtraction is done in the second subtraction circuit 206. The output of the accumulator 231 gives the n*k least significant bits of Z=X+(N*Y0). The fourth storage device 204 stores the bits output from the accumulator 231 from the (k+1)th bit, which corresponds to (n−1)*k least significant bits of S(i). The (n−1)*k least significant bits of S(i) are compared, in the comparison circuit 232, with the (n−1)*k least significant bits of N output from the first register 221.

B-10) There are k+1 successive shifts made on the fourth storage device 204 and on the first register 221. The first and second selection inputs of the selection device 228 receives zeros to be able to provide the k most significant bits of S(i) and finish the comparison of S(i) with N. The result of the comparison is memorized in the next iteration.

C) At the end of the last iteration, the result S(a−1) stored in the fourth storage device must undergo a new subtraction of N if S(a−1)≧N. The subtraction is done by a simultaneous shifting of S(a−1) and N in the second subtraction circuit 206. To recover the result of the subtraction, zeros are given to the selection inputs of the selection device 228 in order to make the accumulator 231 transparent.

Those skilled in the art will see that it is possible to perform the steps of the elementary operation in different variations. For example, the resetting and data loading steps (steps A, B-1, B-2, B-3, B-7) may be eliminated if the coprocessor is in a configuration that corresponds to the situation obtained at the end of one of the steps.

Similarly, the synchronization steps B-4 and B-8 may be modified as a function of the delays induced by the subtraction circuits 205 and 206 and as a function of the number of delay circuits 211 to 214 used. Other steps may overlap, especially the steps relating to the transfer of data between different elements when no computation is done at the same time.

To perform a modular multiplication, it is enough to perform two elementary operations $P_{field}$ by introducing an error correction parameter H. Then, the following are performed: either $P_{field}(H, P_{field}(A, B)_N)_N$, or $P_{field}(A, P_{field}(H, B)_N)_N$, with $H=2^{(a+b)*k} \mod N$.

To perform computation of $A^c \mod N$, C is taken to be an integer encoded on c bits, the most significant bit $2^{c-1}$ of which is equal to 1. It is assumed that A and N are encoded on the same number of bits equal to n*k bits. If A has a size smaller than N, then A is complemented with zeros in most significant bits. The following steps are performed:

a) $H=2^{2*n*k} \mod N$ is computed.

b) $R(1)=P_{field}(H, A)$ is computed and R(1) is stored in the first and second storage devices 201 and 202. The contents of the first device 201 are called A and the contents of the second device 202 are called B.

c) A loop indexed by an index i varying from 2 to c is made:

c-1) A $P_{field}(B, B)_N$ operation is performed, in loading the words of B instead of the words of A during the step B-1. The result is stored in the second storage device 202.

c-2) If the bit with a place value $2^{c-1}$ of C is equal to 1, then an operation $P_{field}(A, B)_N$ is also performed and the result is stored in the second storage device 202.

d) 1 encoded on n*k bits is loaded into the first storage device 201.

e) A $P_{field}(1, B)_N$ operation is performed to obtain the final result.

To perform the computation of $H=2^{(n+p)*k} \mod N$, with p being an integer, the elements of the coprocessor 200 are neutralized in part. The fifth multiplexer 229 is positioned to give zeros at its output. A data element equal to 1 encoded on k bits is loaded into the second latch 226. The sixth multiplexer 230 is positioned to connect the output of the third delay circuit 213 to the second selection input of the selection device 228. The eighth multiplexer 236 is positioned to connect the input of the comparator 232 to the output of the first delay circuit 211. The assembly resulting from these different operations of neutralization converts the coprocessor 200 into a circuit for the computation of H by successive subtractions. A circuit of this kind is described in the European patent No. 601,907.

That which is claimed is:

1. An integrated circuit comprising a modular arithmetic coprocessor comprising:

storage means to store and serially provide a first operand A and a second operand B, a modulo N and a result S, A being an integer encoded on a*k bits, with a being a non-zero integer at most equal to m, and B, N and S being integers encoded on at most m*k bits, and with m and k being integers greater than 1; and computation means to perform modular operations according to the Montgomery method and comprising a first k-bit latch to store a k-bit word Ai of the first operand A, a second k-bit latch to store either a least significant word of N or an intermediate data element Y0 encoded on k bits such that $Y0=((S(i-1)+(Ai*B))*J0) \mod 2^k$, i being a loop index varying from 0 to a−1, S(i−1) being an updated result of S during the (i−1)th iteration, S(−1) being equal to zero, Ai being an ith k-bit word of the first operand A, and J0 being a k-bit word resolving equation $((J0*N)+1) \mod 2^k=0$, addition means to add contents of the first and second latches, selection means coupled to outputs of the first and second latches and to the addition means to give, at a parallel output, either the word contained in the first latch, the word contained in the second latch, a sum of the words contained in the first and second latches, or a word zero as a function of a bit of the second operand B and of a bit of the modalo N, an accumulator circuit that adds, shifts by one bit and stores the words given successively by the selection means with one bit of an updated result, a bit output from the accumulator circuit becoming a new updated result, and a circuit to compute an intermediate data element Y0 connected, first, to the output of the second latch to receive the least significant k-bit word of the module N and, second, to the output of the accumulator circuit to receive a data element X=S(i−1)+Ai+B.

2. A circuit according to claim 1, wherein the circuit to compute the intermediate data element Y0 comprises:

at least one k−1 bit shift storage register that stores data output from the computation means;

at least one multiplication circuit to multiply contents of the at least one storage register by contents of the second latch apart from the least significant bit contained in the second latch and provide a result bit in series; and at least one subtraction cIrcuit for bit-by-bit subtraction of a result output from the at least one multiplication circuit from a result output from the accumulator circuit.

3. A circuit according to claim 1, wherein the computation means further comprises a first k-bit shift register to receive, first, a k-bit word Ai of the first operand A and transmit the word in parallel to the first latch and, second, the modulo N to delay the modulo N by k cycles of a clock signal.

4. A circuit according to claim 1, wherein the addition meant comprises at least one parallel addition circuit.

5. An integrated circuit comprising a modular arithmetic coprocessor comprising:

at least one storage device to store and serially provide a first operand A and a second operand B, a modulo N and a result S, A being an integer encoded on a*k bits, with a being a non-zero integer at most equal to m, and B, N and S being integers encoded on at most m*k bits, and with m and k being integers greater than 1; and a computation circuit to perform modular operations according to the Montgomery method and comprising a first k-bit latch to store a k-bit word Ai of the first operand A, a second k-bit latch to store either a least significant word of N or an intermediate data element Y0 encoded on k bits such that Y0=((S(i−1)+(Ai*B))*J0) mod $2^k$, i being a loop index varying from 0 to a−1, S(i−1) being an updated result of S during the (i−1)th iteration, S(−1) being equal to zero, Ai being an ith k-bit word of the first operand A, and J0 being a k-bit word resolving equation ((J0*N)+1) mod $2^k$=0, and a circuit to compute the intermediate data element Y0 based upon contents of the first and second latches by receiving therefrom the least significant k-bit word of the modulo N and receiving a data element X=S(i−1)+Ai+B.

6. A circuit according to claim 5, wherein the computation circuit further comprises:

an addition circuit to add contents of the first and second latches;

a selection circuit coupled to outputs of the first and second latches and to the addition circuit to give, at a parallel output, either the word contained in the first latch, the word contained in the second latch, a sum of the words contained in the first and second latches, or a word zero as a function of a bit of the second operand B and of a bit of the modulo N;

an accumulator circuit that adds, shifts by one bit and stores the words given successively by the selection circuit with one bit of an updated result, a bit output from the accumulator circuit becoming a new updated result; and the circuit to compute the intermediate data element Y0 is connected to the output of the second latch to receive the least significant k-bit word of the modulo N, and to an output of the accumulator circuit to receive a data element X=S(i−1)+Ai+B.

7. A circuit according to claim 6, wherein the circuit to compute the intermediate data element Y0 comprises:

at least one k−1 bit shift storage register that stores data output from the computation means;

at least one multiplication circuit to multiply contents of the at least one storage register by contents of the second latch apart from the least significant bit contained in the second latch and provide a result bit in series; and at least one subtraction circuit for bit-by-bit subtraction of a result output from the at least one multiplication circuit from a result output from the accumulator circuit.

8. A circuit according to claim 5, wherein the computation circuit further comprises further comprises a first k-bit shift register to receive, first, a kbit word Ai of the first operand A and transmit the word in parallel to the first latch and, second, the module N to delay the modulo N by k cycles of a clock signal.

9. A circuit according to claim 5, wherein the addition circuit comprises a parallel addition circuit.

10. An integrated circuit comprising a modular arithmetic coprocessor comprising:

a storage device for series shifting first and second operands A and B, a modulo N and an updated result, with A being an integer encoded on a*b bits, a being a non-zero integer at most equal to m, and B, N and S being integers encoded on at most m*k bits, and m and k being integers greater than 1; and a circuit for computing an intermediate data element Y0 such that Y0=((S(i−1)+(Ai*B))*J0) mod $2^k$ in an iterative loop indexed by i, with i varying from 0 to a−1, with S(i−1) corresponding to an (i−1)th updated result, S(−1) being equal to 0, Ai being an ith k-bit word of A, and J0 being a k-bit word resolving equation ((J0*N)+1) mod $2^k$=0, said circuit providing Y0 bit by bit, first, from a word N0 of k least significant bits of N and, second, from an intermediate data element X=S(i−1)+Ai*B;

at least one shift register for loading a least significant bit of X that is equal to a least significant bit of Y0;

at least one multiplication circuit for multiplying k−1 most significant bits of N0 by k−1 least significant bits of Y0 by shifting Y0 in the at least one shift register; and at least one subtraction circuit for subtracting bit-by-bit a result output from the at least one multiplication circuit from the k−1 most significant bits of a least significant word of the data element X, an output result bit of the at least one subtraction circuit being a bit of Y0 that is a stored in the at least one shift register.

11. A circuit according to claim 10 further comprising:

a first k-bit latch to store a k-bit word Ai of the first operand A; and a second k-bit latch to store either a least significant word of N or an intermediate data element Y0 encoded on k bits such that Y0=((S(i−1)+(Ai*B))*J0) mod $2^k$, i being a loop index varying from 0 to a−1, S(i−1) being an updated result of S during the (i−1)th iteration, S(i−1) being equal to zero, Ai being an ith k-bit word of the first operand A, and J0 being a k-bit word resolving equation ((J0*N)+1) mod $2^k$0.

12. A circuit according to claim 11, further comprising:

an addition circuit to add contents of the first and second latches;

a selection circuit coupled to outputs of the first and second latches and to the addition circuit to give, at a parallel output, either the word contained in the first latch, the word contained in the second latch, a sum of the words contained in the first and second latches, or a word zero as a function of a bit of the second operand B and of a bit of the modulo N;

an accumulator circuit that adds, shifts by one bit and stores the words given successively by the selection circuit with one bit of an updated result, a bit output from the accumulator circuit becoming a new updated result; and the circuit to compute the intermediate data element Y0 is connected to the output of the second latch to receive the least significant k-bit word or the modulo N, and to an output of the accumulator circuit to receive a data element X=S(i−1)+Ai+B.

13. A method for performing a modular operation according to the Montgomery method comprising the steps of:

series shifting first and second operands A and B, a modulo N and an updated result, with A being an integer encoded on a*b bits, a being a non-zero integer at most equal to m, and B, N and S being integers encoded on at most m*k bits, and m and k being integers greater than 1; and computing an intermediate data element Y0 such that $Y0=((S(i-1)+(Ai*B))*J0) \mod 2^k$ in an iterative loop indexed by i, with i varying from 0 to a−1, with $S(i-1)$ corresponding to an (i−1)th updated result, $S(-1)$ being equal to 0, Ai being an ith k-bit word of A, and J0 being a k-bit word resolving equation $((J0*N)+1) \mod 2^k$, the step of computing comprising providing Y0 bit by bit, first, from a word N0 of k least significant bits of N and, second, from an intermediate data element $X=S(i-1)+Ai*B$, loading in at least one shift register a least significant bit of X that is equal to a least significant bit of Y0, multiplying in at least one multiplication circuit k−1 most significant bits of N0 by k−1 least significant bits of Y0 by shifting Y0 in the shift register, and subtracting bit-by-bit in at least one subtraction circuit a result output from the at least one multiplication circuit from the k−1 most significant bits of a least significant word of the data element X, an output result bit of the subtraction circuit being a bit of Y0 that is stored in the at least one shift register.

14. A method according to claim claim 13 further comprising repeating the following steps, with i being an index varying from 0 to a−1:

storing a k-bit word Ai corresponding to a word with a place value i of A in a first k-bit latch;

computing the intermediate data element Y0;

storing the least significant k-bit word of N and Y0 in a second k-bit latch;

adding in a parallel addition circuit the words stored in the first and second latches;

selecting and supplying either the word contained in the first latch, the word contained in the second latch, a sum of the words contained in the first and second latches or a word zero as a function, first, of a bit of B and, second, either a bit of Y0 or a bit of N; and adding successively in an accumulator circuit the words given by a selection device for each pair of bits of B and N, a result of each addition being added to a bit of a previous updated result $S(i-1)$ and shifting by one bit and storing between each addition, a bit output from the accumulator circuit during a shift corresponding to a new updated result $S(i)$.

15. A method according to claim 14, wherein the storage of a word Ai in the first latch is done by k shifts of the word Ai in the first register and then by parallel loading in the first latch after the word Ai has been loaded into the first register.

16. A method according to claim 15, wherein the modular operations according to the Montgomery are implemented by a coprocessor; the method further comprising the step of resetting the coprocessor comprising:

loading the data elements A, B, N respectively into first to third storage devices;

loading zeros into a fourth storage device so that a data element is called $S(-1)$; and resetting a comparison circuit so that a last comparison indicates that N is greater than $S(-1)$.

17. A method according to claim 16, further comprising the steps of repeating a times the following computation loop, with i being an index varying from 0 to a−1;

simultaneously loading an ith least significant word Ai of A into a first register of the at least one shift register and an N0 least significant word of N into a second register of the at least one shift register;

simultaneously loading of the words Ai and N0 respectively into the first and second latches; and resetting the at least one subtraction circuit, delay circuits, the first register and the latches.

18. A method according to claim 17, further comprising the step of making k successive shifts of the words B and $S(i-1)$ contained in the second and fourth storage devices, and on the second register, an output of a computation circuit is connected to an input of the second register, the data element B being given to a first selection input of a selection device, a second selection input of the selection device receiving zeros, a series input of an accumulator circuit receiving $S(i-1)$ if a last comparison indicates that $S(i-1)<N$, or receiving $S(i-1)-N$ if a last comparisor indicates that $S(i-1)\geq N$, an output of the accumulator giving the k least significant bits of $X=S(i-1)+Ai*B$ bit by bit.

19. A method according to claim 18, further comprising the steps of:

transferring contents of the second register equal to Y0 into the second latch;

resetting of the at least one subtraction circuit, the delay circuits, the first register and latches of an accumulator circuit;

making n*k successive shifts on the words B, N and $S(i-1)$ in the second to fourth storage devices and on the first register, the data element B being given to the first selection input of the selection device, the data element N being given bit by bit, first, to the input of the first register and, second, to the second selection input of the selection device, the series input of the accumulator circuit receiving $S(i-1)$ if the last comparison indicates that $S(i-1)<N$ or receives $S(i-1)-N$ if the last comparison indicates that $S(i-1)\geq N$, the fourth storage device storing the bits output from the accumulator starting from the (k+1)th bit, which corresponds to (n−1)*k least significant bits of $S(i)$, the (n−1)*k least significant bits of $S(i)$ being compared in the comparison circuit with the (n−1)*k least significant bits of N output from the first register; and making of k+1 successive shifts on the fourth storage device and on the first register, the first and second selection inputs of the selection device receiving zeros to provide the k most significant bits of $S(i)$ and finish the comparison of $S(i)$ with N, a result of the comparison being stored in a next iteration.

20. A method according to claim 19, further comprising the step of at an end of a last iteration storing a result $S(a-1)$ in the fourth storage device having to undergo a new subtraction of N if $S(a-1)\geq N$, a subtraction being done by a simultaneous shifting of $S(a-1)$ and N in a second subtraction circuit of the at least one subtraction circuit.

* * * * *

UNITED STATES PATENT AND TRADEMARK OFFICE
CERTIFICATE OF CORRECTION

PATENT NO. : 6,668,267 B1 Page 1 of 1
DATED : December 23, 2003
INVENTOR(S) : Alain Pomet It is certified that error appears in the above-identified patent and that said Letters Patent is hereby corrected as shown below:

Column 11,
Line 39, delete "bits of No" insert -- bits of N0 --

Column 17,
Line 22, delete "to claim claim 13" insert -- to claim 13 --

Signed and Sealed this

Fifteenth Day of June, 2004

JON W. DUDAS
*Acting Director of the United States Patent and Trademark Office*